Apr. 3, 1923.
E. J. BURSHEIM
TRACTOR
1,450,837
Original Filed July 29, 1921
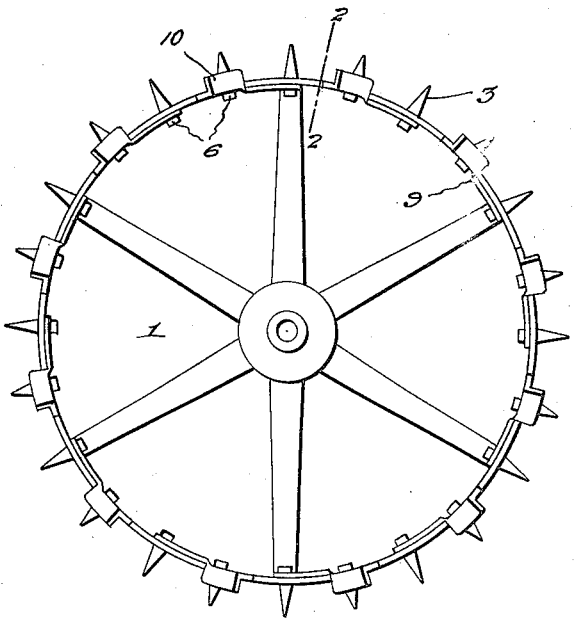
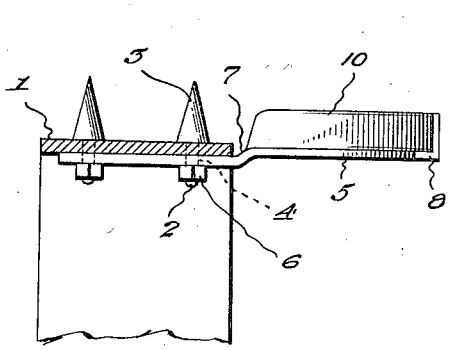
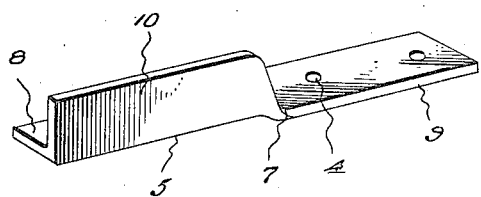
E. J. Bursheim, INVENTOR
BY Victor J. Evans, ATTORNEY
WITNESS:

Patented Apr. 3, 1923.

1,450,837

UNITED STATES PATENT OFFICE.

EILERT J. BURSHEIM, OF SPERLING, MANITOBA, CANADA.

TRACTOR.

Application filed July 29, 1921, Serial No. 488,397. Renewed October 17, 1922. Serial No. 595,168.

*To all whom it may concern:*

Be it known that I, EILERT J. BURSHEIM, a citizen of the United States of America, residing at Sperling, in the Province of Manitoba and Dominion of Canada, have invented new and useful Improvements in Tractors, of which the following is a specification.

My present invention has reference to a means for increasing traction between the ground wheel of a vehicle and the surface over which it travels.

An object is to provide the ground wheel of a vehicle with removable calks and with angularly disposed lugs of a peculiar construction which project beyond one or both of the sides of the vehicle to engage with the ground surface over which the wheel travels, and whereby the traction between the wheel and such surface will be effectively increased without danger of the ground material clogging between the lugs.

The foregoing, and other objects will appear as the nature of the invention is better understood, may be accomplished by a construction, combination and operative association of parts such as is disclosed by the drawings which accompany and which form part of this specification.

In the drawings:—

Figure 1 is an edge view of the traction wheel provided with the improvement.

Figure 2 is a greatly enlarged sectional view approximately on the line 2—2 of Figure 1.

Figure 3 is a perspective view of one of the lugs.

Referring now to the drawings in detail, the numeral 1 designates a tractor or other vehicle wheel. The wheel, at desired intervals is provided with openings which are preferably arranged in series adjacent to the edges thereof. Through these openings pass the threaded shanks 2 of calks 3. The shanks 2 also pass through openings 4 in lugs 5. The shanks of two calks pass through each lug, and the said shanks are engaged by nuts 6 which hold both the lugs and calks on the wheel.

The lugs 5 are each of a similar construction, being preferably formed from a flat strip of suitable metal. Each of the lugs, outward of its connected portion is bent or otherwise twisted upon itself, as at 7 to provide an extension 8 which is arranged beyond the plane of the body portion 9 of the said lug. Thus one edge of each of the portions 8 is in ground contacting position. The ground engaging portions 8 of each of the lugs is further bent or otherwise formed upon itself to provide the inner edge thereof with an angle portion 10. Thus the ground engaging portions of each of the lugs is substantially L-shaped in cross section. The lugs projecting beyond one or both of the sides of the wheel not only materially increase the traction between the wheel and the surface over which the wheel travels, but the said lugs being spaced from each other provide openings therebetween for the free passage of the earth gathered thereon in the movement of wheel over the ground surface. The calks 3 permit of the wheel traveling over icy surfaces and the lugs are sufficiently yieldable to permit of the springing of the same should they contact with hard substances.

As the calks are arranged in staggered relation on the wheel in a manner whereby the series of calks adjacent one edge of the wheel are disposed centrally between the series of calks adjacent the opposite edge, and as two of the calks of both series pass through the openings 4 in the body portion 9 of the improvement, the lugs 5 are thus disposed angularly on the wheel as disclosed in Figures 1 and 2 of the drawing.

What I claim is:—

1. A traction wheel, calks having threaded shanks passing therethrough, lugs on the inner face of the wheel through which the shanks also pass, nuts securing the shanks to the lugs, and said lugs being projected beyond the edges of the wheel.

2. A traction wheel, calks having threaded shanks passing therethrough, lugs on the inner face of the wheel through which the shanks also pass, nuts securing the shanks to the lugs, said lugs being projected beyond the edges of the wheel and having their outer portions twisted and extended to provide right angularly disposed ground contacting members.

In testimony whereof I affix my signature.

EILERT J. BURSHEIM.